United States Patent [19]
Van Gilder

[11] 3,914,685
[45] Oct. 21, 1975

[54] REGULATED FERRORESONANT POWER SUPPLY WITH SOFT START
[75] Inventor: Burrows C. Van Gilder, North Wales, Pa.
[73] Assignee: Eltra Corporation, Toledo, Ohio
[22] Filed: May 6, 1974
[21] Appl. No.: 467,191

[52] U.S. Cl. .................. 323/20; 321/8; 321/18; 323/60; 323/61
[51] Int. Cl.² .................. H02P 13/26; G05F 1/64
[58] Field of Search ......... 323/6, 20, 22 SC, 24, 60, 323/61; 321/8, 25, 16, 18

[56] References Cited
UNITED STATES PATENTS

| | | | |
|---|---|---|---|
| 3,155,894 | 11/1964 | Bell | 321/25 X |
| 3,458,796 | 7/1969 | Cassady | 323/22 SC |
| 3,480,852 | 11/1969 | Hung | 323/20 X |
| 3,573,605 | 4/1971 | Hart et al. | 323/60 |
| 3,723,854 | 3/1973 | Kita | 323/20 |
| 3,824,449 | 7/1974 | Hase | 323/60 X |

Primary Examiner—Gerald Goldberg
Attorney, Agent, or Firm—Oliver E. Todd, Jr.

[57] ABSTRACT

An improved regulated DC power supply using a ferroresonant power transformer. The transformer includes a primary winding which is separated from a secondary winding and a resonant winding by a magnetic shunt on a transformer core. A ferrocapacitor is connected across the resonant winding. A control circuit operates an electronic switch for connecting a linear inductor across at least a portion of the resonant winding at a predetermined time in each half cycle for regulating the voltage across the secondary winding. The voltage across the secondary winding is rectified to obtain the regulated DC output. Circuitry is provided for advancing the operation of the electronic switch during each half cycle when power is initially applied to the transformer primary winding to initially reduce the DC output voltage. Operation of the electronic switch also may be advanced if the load current demands exceed a predetermined maximum.

6 Claims, 1 Drawing Figure

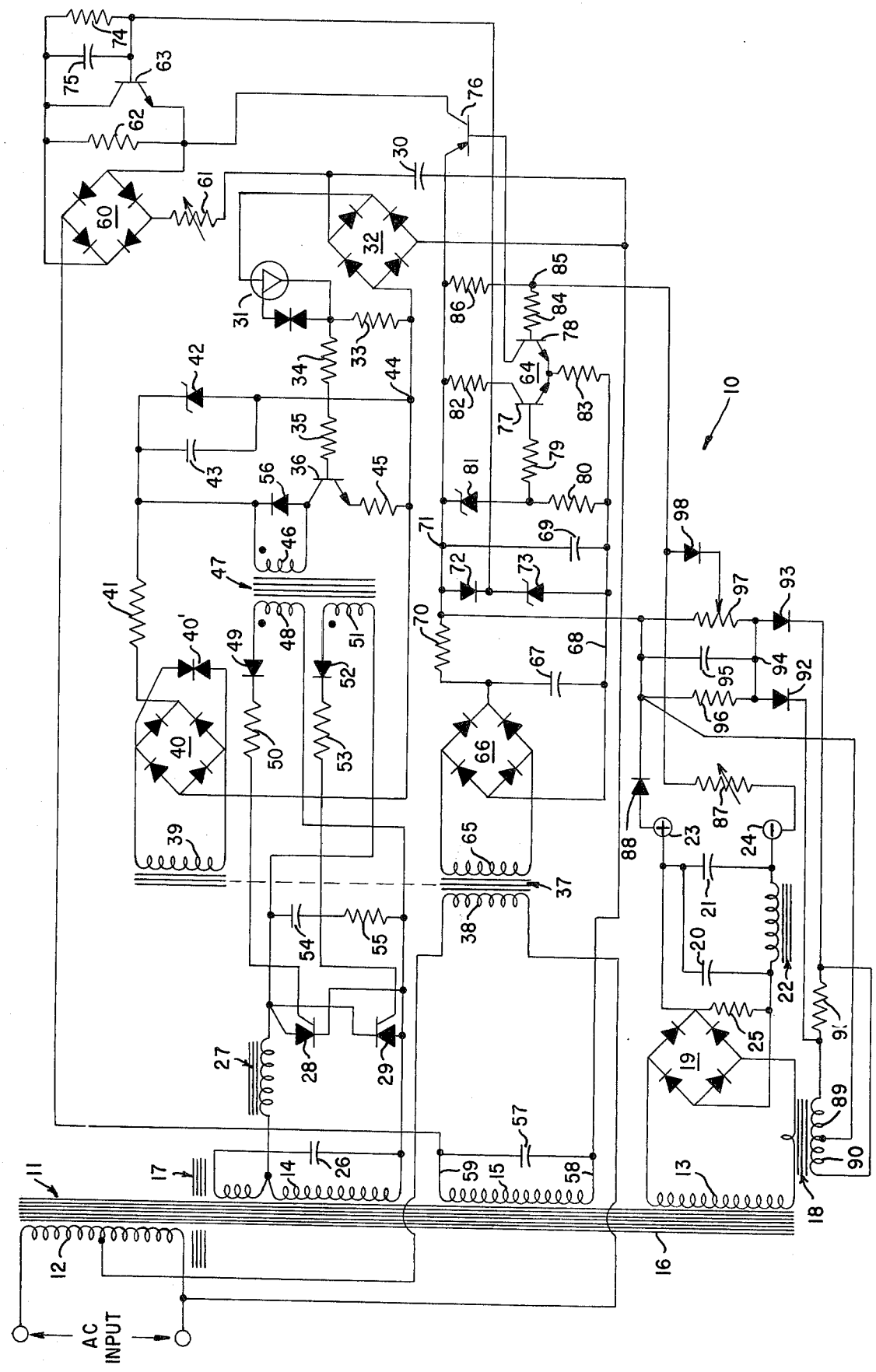

REGULATED FERRORESONANT POWER SUPPLY WITH SOFT START

BACKGROUND OF THE INVENTION

This invention relates to DC power supplies and more particularly to an improved regulated DC power supply using a ferroresonant power transformer and an improved control circuit including means for providing a reduced output voltage when power is initially applied to the ferroresonant transformer.

Ferroresonant power supplies are one well known device used for obtaining a regulated DC voltage. They are simple and reliable, often consisting of only a saturable reactor power transformer and a ferrocapacitor. They provide good output voltage regulation with changes in line voltage, input noise suppression, inherent output short circuit protection, good input power factor and a relatively square output waveform that is particularly well suited for rectifying and filtering. However, they do have an inherent problem with frequency stability. Since a ferroresonant transformer includes a resonant circuit, the transformer must be operated at a single design frequency to obtain the desired regulated output voltage.

In an improved ferroresonant power supply circuit, a feedback control circuit is provided for, in effect, simulating saturation of the transformer core, which actually never becomes saturated. In this design, a magnetic shunt separates the resonant winding from the primary winding on the core of the power transformer. The control circuit monitors the volttime integral of the transformer output voltage and uses such integral for initiating discharge of the ferrocapacitor during each half cycle. By proper timing of the discharge of the ferrocapacitor in each half cycle, the output voltage becomes constant and independent of variations in voltage and frequency of the input and changes in the output load. Such a system is shown, for example, in U.S. Pat. No. 3,525,035 which issued on Aug. 18, 1970 to Kakalec. In the circuit disclosed in this patent, a resistor-capacitor combination is provided for developing a voltage proportional to the volt-time integral of the ferrocapacitor voltage. Discharge of the ferrocapacitor is initiated when the generated voltage reaches a predetermined level. However, to date, prior art devices of this type have made no provision for protecting the load from power surges when power is initially applied to the power transformer. In some instances, the initial power surge may damage or completely destroy either the load or the power supply.

SUMMARY OF THE INVENTION

According to the present invention, an improved ferroresonant power supply is provided having control circuitry for regulating the output voltage independent of input frequency and also for providing for a "soft start" or reduced output voltage when power is initially applied to the power supply. The power suppy includes a ferroresonant transformer having a primary winding separated from a secondary winding and a resonant winding by means of a magnetic shunt on the transformer core. The output from the secondary winding is rectified for obtaining a regulated DC voltage. A ferrocapacitor, also known as a ferroresonanting capacitor or simply as a resonant capacitor, is connected across the resonant winding and an inductor is also connected through an electronic switch across at least a portion of the resonant winding for resonantly discharging the ferrocapacitor. A voltage is developed across a capacitor at a rate which is the integral of the output voltage level. When the voltage developed across the capacitor reaches a fixed forward switching voltage of a voltage breakdown device during each half cycle, the electronic switch is energized to connect the inductor across the resonant winding to discharge the ferrocapacitor, thereby simulating saturation of the transformer core. A differential amplifier is provided for comparing a reference voltage with the output voltage. The comparison is used for controlling the rate at which the capacitor which triggers the voltage breakdown device is charged. During normal operation of the power supply, the reference voltage applied to the differential amplifier is regulated to a fixed voltage. However, when power is initially applied to the power supply, the reference voltage is initially maintained at a reduced level. The reduced reference voltage results in an increased charging rate for the timing capacitor. This in turn results in an advance in the firing or energizing of the electronic switch during each half cycle to advance the time at which the ferrocapacitor is discharged. As a consequence, the output voltage is reduced when power is initially applied to the improved ferroresonant power supply. The rate at which the timing capacitor is charged also may be increased in the event that the load current exceeds a predetermined maximum.

Accordingly, it is a preferred object of the invention to provide an improved regulated direct current power supply.

Another object of the invention is to provide a frequency independent ferroresonant power supply including circuitry for initially reducing the output voltage when excitation is applied to the power supply.

Still another object of the invention is to provide an improved frequency independent ferroresonant power supply which includes control circuitry for limiting the maximum output current.

Other objects and advantages of the invention will become apparent from the following detailed description, with reference being made to the accompanying drawing.

BRIEF DESCRIPTION OF THE DRAWING

The single FIGURE shows a detailed schematic circuit diagram of an improved ferroresonant power supply constructed in accordance with the present invention.

DESCRIPTION OF THE PREFERRED EMBODIMENT

Turning now to the drawing, an improved regulated DC power supply 10 is shown embodying the principles of the present invention. The power supply 10 includes a power transformer 11 having a primary winding 12, a secondary winding 13, a resonant winding 14 and a control winding 15 mounted on a magnetic core 16. A magnetic shunt 17 on the core 16 separates the primary winding 12 from the secondary winding 13, the resonant winding 14 and the control winding 15 in a conventional manner.

The secondary winding 13 is connected through the primary of a current transformer 18 to the input of a full wave bridge rectifier 19. The DC output of the bridge rectifier 19 is connected through a filter comprising two capacitors 20 and 21 and an inductor 22 to a positive output terminal 23 and a negative output terminal 24. A bleeder resistor 25 is also connected across the output of the bridge rectifier 19. The load terminals 23 and 24 may be connected to supply energy to a DC load. For example, if the power supply 10 is used as a battery charger for a nominal 12-volt battery, the output voltage across the terminals 23 and 24 may be set to 14 volts and the terminals 23 and 24 are then connected directly across a battery to be charged.

The output of the power supply 10 is designed such that when the transformer primary winding 12 is initially excited by an external AC power source, a reduced voltage will appear across the output terminals 23 and 24. Thus, if the power supply 10 normally provides 14 volts for charging a battery, the initial voltage across the terminals 23 and 24 may be on the order of perhaps 11 volts to prevent an initial power surge into the battery. The charging current to the battery will increase as the output voltage increases from the initial 11 volts up to the regulated 14 volts. The battery will then charge until its terminal voltage reaches 14 volts at full charge at which time only a trickle charge or minimum current will be supplied to the battery.

A ferrocapacitor 26 is connected across the resonant winding 14 on the power transformer 11. The transformer 11 is designed such that the core 16 never becomes saturated during operation of the power supply 10. However, saturation is simulated by effecting discharge of the ferrocapacitor 26 at a predetermined point during each half cycle. Discharge is effected by means of a linear reactor 27 connected in series with an electronic switch comprising a pair of back-to-back silicon controlled rectifiers 28 and 29 connected across at least a portion of the resonant winding 14. Although the reactor 27 and the switches 28 and 29 may be connected across the entire resonant winding 14, it may be desirable to connect them across only a portion of the resonant winding, as shown, to reduce the voltage and current ratings of the controlled rectifiers 28 and 29. Firing of the appropriate one of the controlled rectifiers 28 and 29 is accomplished by means of a feedback control circuit which is responsive to the output voltage and current at the terminals 23 and 24 and also to the initial application of power to the transformer primary winding 12.

During each half cycle, one of the controlled rectifiers 28 or 29 is fired when a timing capacitor 30 is charged up to the breakdown or forward switching voltage of a breakdown device such as a silicon unilateral switch (SUS) 31. However, it will be appreciated that other types of voltage breakdown devices, such as a Zener diode or a gas filled discharge tube, may be used in place of the SUS 31. An AC signal is applied to the capacitor 30 for reversing the polarity of the charge on or voltage across the capacitor 30 during each half cycle. The actual voltage appearing across the capacitor 30 is determined by the output across the terminals 23 and 24. A full wave bridge rectifier 32 has input terminals connected across the capacitor 30 and Dc output terminals connected through a resistor 33 to the SUS 31. Whenever the voltage across the capacitor 30 reaches the forward switching voltage of the SUS 31, a current will flow through the resistor 33. This results in a voltage drop across the resistor 33 which is applied through a resistor 34 and a resistor 35 to the base or control electrode of a transistor 36.

An auxiliary transformer 37 has a primary winding 38 connected in parallel with at least a portion of the primary winding 12 of the power transformer 11 for excitation from the external AC power source. A secondary winding 39 on the auxiliary transformer 37 is connected to the inputs of a full wave bridge rectifier 40. A surge protector 40' may be connected across the inputs to the bridge rectifier 40 to protect the circuitry connected to the output from the bridge rectifier from voltage surges. A resistor 41 and a Zener diode 42 are connected in series across the output of the bridge rectifier 40. A capacitor 43 is connected in parallel with the Zener diode 42 such that it is charged to the regulated Zener voltage of the diode 42. A common junction 44 is formed with the negative output terminals from the bridge rectifiers 40 and 32, one side of the Zener diode 42, one side of the capacitor 43 and the resistor 33. A resistor 45 is connected between the emitter of the transistor 36 and the junction 44. The collector of the transistor 36 is connected through a primary winding 46 on a pulse transformer 47 to the junction between the resistor 41 and the parallel diode 42 and capacitor 43. Thus, when the transistor 36 is biased into a conducting state, the capacitor 43 is discharged through the resistor 45 and the primary winding 46 on the pulse transformer 47. A first secondary winding 48 on the pulse transformer 47 is connected through a diode 49 and a resistor 50 between the gate and cathode of the SCR 28. A second secondary winding 51 on the pulse transformer 47 is connected through a diode 52 and a resistor 53 between the gate and cathode of the SCR 29. Thus, when the capacitor 30 is charged sufficiently to break down the SUS 31 and the transistor 36 begins conduction, the capacitor 43 is discharged through the primary winding 46 of the pulse transformer 47 and trigger signals are applied simultaneously to the gate electrodes of both SCR's 28 and 29. Depending upon the polarity of the voltage applied across the SCR's 28 and 29 from the resonant winding 14, one of the SCR's 28 or 29 will then conduct. When conduction by one of the SCR's 28 or 29 begins, the charge on the ferrocapacitor 26 is discharged through the reactor 27. When the capacitor 26 is discharged, the SCR 28 or 29 will cease to conduct. Subsequently, the capacitor 26 will be charged to the opposite polarity. A capacitor 54 and a resistor 55 are connected in series across the parallel SCR's 28 and 29 for protecting the SCR's 28 and 29 from transients. The diodes 49 and 52 across the secondary windings 48 and 51 respectively, of the transformer 47 and a diode 56 across the primary of the transformer 57 assure that only a single trigger pulse will be applied to the gate terminals of the SCR's 28 and 29 during each half cycle. The diode 56 also protects the transistor 36 from a back EMF established across the primary winding 46.

The control winding 15 on the power transformer 11 provides a source of power for charging the timing capacitor 30. A capacitor 57 is connected across the control winding 15. One end 58 of the control winding 15 is connected directly to the timing capacitor 30, while the opposite end 59 is connected through a full wave bridge rectifier 60 and a variable resistor 61 to the capacitor 30. The rate at which the timing capacitor 30 is charged is dependent upon the total resistance of a load applied across the output of the bridge 60 and of the variable resistor 61. A fixed resistor 62 and the collector-emitter electrodes of a transistor 63 are connected in parallel across the output terminals of the bridge 60. The effective resistance of the parallel resistor 62 and transistor 63 controls the resistance appearing across the input terminals of the bridge 60 for controlling the charging rate of the capacitor 30 during each half cycle. Conduction by the transistor 63 is determined at any given instant in response to either the load voltage across or current to the terminals 23 and 24 or, when power is first applied to the primary winding 12 of the power transformer 11, in response to circuitry which drives the transistor 63 into saturation. When the transistor 63 is saturated, the effective resistance across the input of the bridge 60 is at a minimum to minimize the charging time of the capacitor 30. Therefore, the SCR's 28 and 29 will be fired at an advanced point during each half cycle to reduce the output voltage across the terminals 23 and 24.

A control circuit including a differential amplifier 64 controls conduction by the transistor 63. A second secondary winding 65 on the auxiliary transformer 37 supplies power for operating the differential amplifier 64 and the transistor 63. The secondary winding 65 is connected across the input to a full wave bridge rectifier 66. A filter capacitor 67 is connected across the DC output from the bridge rectifier 66. The negative output terminal 68 from the bridge rectifier 66 is connected to one side of a capacitor 69 while the positive output terminal is connected through a resistor 70 to a positive buss 71 to which the other side of the capacitor 69 is connected. The base of the transistor 63 is connected through a diode 72 to the positive buss 71 and through a Zener diode 73 to the negative output terminal 68 from the bridge rectifier 66. The Zener diode 73 regulates the voltage applied to the base of the transistor 63. The base of the transistor 63 is also connected through a parallel resistor 74 and capacitor 75 to the collector of the transistor 63.

The positive buss 71 is connected through the emitter and collector electrodes of a transistor 76 to the emitter of the transistor 63. The differential amplifier 64 supplies base drive to the transistor 76 which controls conduction by the transistor 63. The differential amplifier 64 includes a pair of transistors 77 and 78. The base of the transistor 77 is connected through a resistor 79 to a junction between a resistor 80 connected to the negative output terminal 68 from the bridge rectifier 66 and through a Zener diode 81 connected to the positive buss 71. The collector of the transistor 77 is connected through a resistor 82 to the positive buss 71. The emitters of the transistors 77 and 78 are connected together through a resistor 83 to the negative output terminal 68. The transistor 78 has a base connected through a resistor 84 to a junction 85 which is connected through a resistor 86 to the positive buss 71 and through a variable resistor 87 to the negative load terminal 24. The positive load terminal 23 is connected through a diode 88 to the positive buss 71. Finally, the collector of the transistor 78 is connected directly to the base of the transistor 76.

The differential amplifier 64 functions to adjust the emitter-to-base current of the transistor 76, normally in response to the load voltage appearing across the terminals 23 and 24. If the load voltage becomes too high, the differential amplifier 64 will reduce the emitter-to-base current in the transistor 76 to reduce the load voltage. Similarly, if the load voltage drops, the differential amplifier 64 will increase the emitter-to-base current of the transistor 76 to increase the load voltage. As the emitter-to-base current in the transistor 76 is varied, the state of conduction of the transistor 63 will vary to control the charging rate of the capacitor 30. Variation in the charging rate of the capacitor 30 in turn affects the phase or timing during each half cycle in which the SCR's 28 and 29 are fired to limit the load voltage to a predermined value.

The soft start or initially reduced load voltage is provided by the time constant of the resistor 70 and the capacitor 69 along with the operation of the differential amplifier 64. When power is initially applied to the primary winding 12 of the power transformer 11, the capacitor 69 will be discharged. This causes the transistor 63 to be driven into saturation, thereby minimizing the effective resistance across the input terminals to the bridge rectifier 60. This reduces the charging time for the capacitor 30 to a minimun value established primarily by the setting of the variable resistor 61. With a minimum charging time for the capacitor 30, the SCR's 28 and 29 are fired early in each half cycle, thereby reducing the load voltage across the terminals 23 and 24.

The actual initial load voltage will be determineed by the value of the variable resistor 61. If the regulated DC power supply 10 is used for example, to charge a 12-volt battery, the ppwer supply 10 may be designed to normally have an output of 14 volts and to initially have approximately 80% of this value or an output of about 11 volts when power is first applied to the transformer 11. This reduced output will protect the battery from an initially high current surge which could be damaging to the battery and/or the power supply 10. As the capacitor 69 becomes charged, the collector-to-emitter current of the transistor 76 increases until the transistor 63 becomes unsaturated and takes over control of the charging time of the capacitor 30. Eventually, the capacitor 69 will be charged to a constant voltage determined by the rating of of the Zener diode 73 and the forward voltage of the diode 72. At this time, the output voltage across the load terminals 23 and 24 will be fully regulated Provisions are also made for limiting the maximum output current from the power supply 10. The current transformer 18 monitors the output current supplied to the load terminals 23 and 24. The current transformer 18 has a center tapped secondary winding 89. The center tap 90 on the secondary winding 89 is connected directly to the positive buss 71. A load resistor 91 is connected across ends of the secondary winding 89. The ends of the secondary winding 89 are also connected through diodes 92 and 93 to a junction 94 to form a full wave rectifier. A filter capacitor 95 and a resistor 96 are connected in parallel between the junction 94 and the positive buss 71. The actual voltage between the junction 94 and the positive buss 71 will be proportional to the load current delivered to the output terminals 23 and 24. A potentiometer 97 is also connected between the junction 94 and the positive buss 71 to form a voltage divider. The center tap of the potentiometer 97 is connected through a diode 98 to the junction 85.

During normal operation of the regulated power supply 10, the diode 98 will be back biased. However, when the load current delivered through the terminals 23 and 24 reaches a preselected maximum, as determined by the setting of the potentiometer 97, the diode 98 will become forward biased. Thereafter, the load current will affect the voltage appearing between the junction 85 and the positive buss 71 rather than the load voltage. Any attempts to further increase the load current will advance the firing of the SCR's 28 and 29 to reduce the load voltage. The power supply 10 will then function as a constant current source rather than a constant voltage source. Thus, the battery under charge or other load connected to the output terminals 23 and 24 will be protected from excessive current.

From the foregoing description, it will be appreciated that the power supply 10 has a frequency-independent output due to the feedback control circuit. However, the power supply 10 has further features in that a soft start is provided, which has heretofore not been present in ferroresonant power supplies. The soft start comprises a reduced output voltage when power is initially applied to the power transformer 11 and such reduced voltage is readily adjusted by means of the variable resistor 61. Furthermore, the normal output voltage is readily adjusted to a predetermined value by means of the variable resistor 87. The power supply 10 may also be adjusted to deliver up to a predetermined maximum output current and to thereafter function as a current source. The maximum output current is readily adjusted by means of the potentiometer 97.

It will be appreciated that various modifications and changes may be made in the above-described power supply 10 without departing from the spirit and the scope of the claimed invention.

What I claim is:

1. A regulated DC power supply comprising, in combination, a power transformer including a primary winding for excitation from an externa AC power source, a secondary winding and a resonant winding mounted on a magnetic core, said core having a magnetic shunt between said primary winding and said secondary and resonant windings, a ferrocapacitor connected across said resonant winding, an electronic switch, an inductor, means connecting said switch and said inductor in series across at least a portion of said resonant winding, means for rectifying the voltage across said secondary winding to obtain a DC output, control means for establishing conduction through said electronic switch at a predetermined time in each half cycle to initiate discharging said ferrocapacitor for regulating the DC output, said control means including means for comparing a reference voltage with a voltage proportional to the DC output voltage and means for controlling conduction by said electronic switch in response to such comparison by said comparing means, and timing means for automatically reducing the reference voltage for a predetermined time interval when said primary winding is initially excited from the external AC source, said reduced reference voltage advancing conduction by said electronic switch during each half cycle whereby the voltage across said DC output is initially at a reduced voltage.

2. A regulated DC power supply, as set forth in claim 1, and including means for adjusting the amount at which the voltage at said DC output is initially reduced.

3. A regulated DC power supply, as set forth in claim 2, and further including means for generating a voltage proportional to the current delivered by said power supply to a load connected to said output, and means responsive to a preselected maximum load current for causing said comparing means to compare the reference voltage with such voltage proportional to the load current whereby said power supply has a regulated output voltage up to such preselected maximum current and a substantially constant current output for load demands above such preselected maximum current.

4. A regulated DC power supply, as set forth in claim 1, wherein said comparing means is a differential amplifier.

5. A regulated DC power supply comprising, in combination, a power transformer including a primary winding for excitation from an external AC power source, a secondary winding and a resonant winding mounted on a magnetic core, said core having a magnetic shunt between said primary winding and said secondary and resonant windings, a ferrocapacitor connected across said resonant winding, an electronic switch, an inductor, means connecting said switch and said inductor in series across at least a portion of said resonant winding, means for rectifying the voltage across said secondary winding to obtain a DC output, and control means for establishing conduction through said electronic switch at a predetermined time in each half cycle to regulate the DC output, said control means including means for automatically advancing the time in each half cycle at which conduction is established through said switch in each half cycle for a predetermined time interval when power is initially applied from the external AC source to said primary winding whereby the DC output is initially at a reduced voltage.

6. A regulated DC power supply comprising, in combination, a power transformer including a primary winding for excitation from an external AC power source, a secondary winding and a resonant winding mounted on a magnetic core, said core having a magnetic shunt between said primary winding and said secondary and resonant windings, a ferrocapacitor connected across said resonant winding, an electronic switch, an inductor, means connecting said switch and said inductor in series across at least a portion of said resonant winding, means for rectifying the voltage across said secondary winding to obtain a DC output, and control means for establishing conduction through said electronic switch at a predetermined time in each half cycle, said control means including means for timing conduction through said electronic switch to maintain a predetermined constant DC output voltage up to a preselected maximum load current, means for advancing conduction by said electronic switch for load demands above such preselected maximum load current to limit the maximum output current from said power supply and means for automatically advancing the time in each half cycle at which conduction is established through said switch in each half cycle for a predetermined time interval when power is initially applied from the external AC source to said primary winding whereby the DC output is initially at a reduced voltage.

* * * * *

UNITED STATES PATENT OFFICE
CERTIFICATE OF CORRECTION

PATENT NO. : 3,914,685
DATED : October 21, 1975
INVENTOR(S) : Burrows C. Van Gilder It is certified that error appears in the above-identified patent and that said Letters Patent are hereby corrected as shown below:

Column 3, line 60, the letters "Dc" should read "DC";

Column 6, line 27, the word "ppwer" should read "power";

Column 7, line 34, the word "externa" should read "external"; and line 63, the number "2" should read "1".

Signed and Sealed this thirtieth Day of March 1976

[SEAL]

Attest:

RUTH C. MASON
Attesting Officer

C. MARSHALL DANN
Commissioner of Patents and Trademarks